June 7, 1960 T. W. KWAP ET AL 2,939,969

TIME DELAY CIRCUIT

Filed April 7, 1959 2 Sheets-Sheet 1

INVENTOR.
THEODORE W. KWAP
EUGENE R. KEELER
BY H. L. Mackey
ATTORNEY.

INVENTOR.
THEODORE W. KWAP
EUGENE R. KEELER
BY
ATTORNEY.

United States Patent Office 2,939,969
Patented June 7, 1960

2,939,969

TIME DELAY CIRCUIT

Theodore W. Kwap, Brewster, and Eugene R. Keeler, Flushing, N.Y., assignors to General Precision, Inc., a corporation of Delaware Filed Apr. 7, 1959, Ser. No. 804,759
6 Claims. (Cl. 307—88.5)

This invention relates to time delay circuits and more particularly to time delay circuit suitable for use with bistable driven circuits.

Bistable driven multivibrators or flip-flops, as they are more commonly called, are used extensively in computer logic circuit design. These circuits under certain conditions require precise and uniform time delays between the driving or clock pulses applied to the multivibrator input and the circuit output. When transistors are used in a conventional Eccles-Jordan type bistable driven multivibrator the time delay between the clock pulses applied to the input and the circuit output is a function of the saturation delay inherent in the particular transistor used and the power supply voltage. Therefore, for certain high speed applications this situation is intolerable since the delay is neither precise nor uniform.

One object of this invention is to provide a bistable driven multivibrator delay circuit suitable for use in high speed logic circuits which has a precise and uniform time delay between the circuit input and output.

Another object of the invention is to provide a bistable driven multivibrator delay circuit which is dependent on fixed circuit elements, such as resistors and capacitors, for time delay.

A further object is to provide a circuit, as set forth above, in which the time delay is not affected by power supply voltage variations.

The invention contemplates a delay circuit comprising a bistable trigger circuit adapted to be connected to a source of trigger pulses and having a first and a second output, first and second switching means each having an input and an output, a summing network interconnecting said bistable trigger circuit and said switching means, said network including first means for applying the integral of the first output and the differential of the second output to the first switching means input and second means for applying the differential of the first output and the integral of the second output to the second switching means input, and commutating means connecting the first switching means output to the second switching means input and the second switching means output to the first switching means input to increase the speed of operation of said first and second switching means.

The foregoing and other objects and advantages of the invention will appear more clearly from a consideration of the specification and drawings wherein one embodiment of the invention is described and shown in detail for illustration purposes only.

Figure 1:
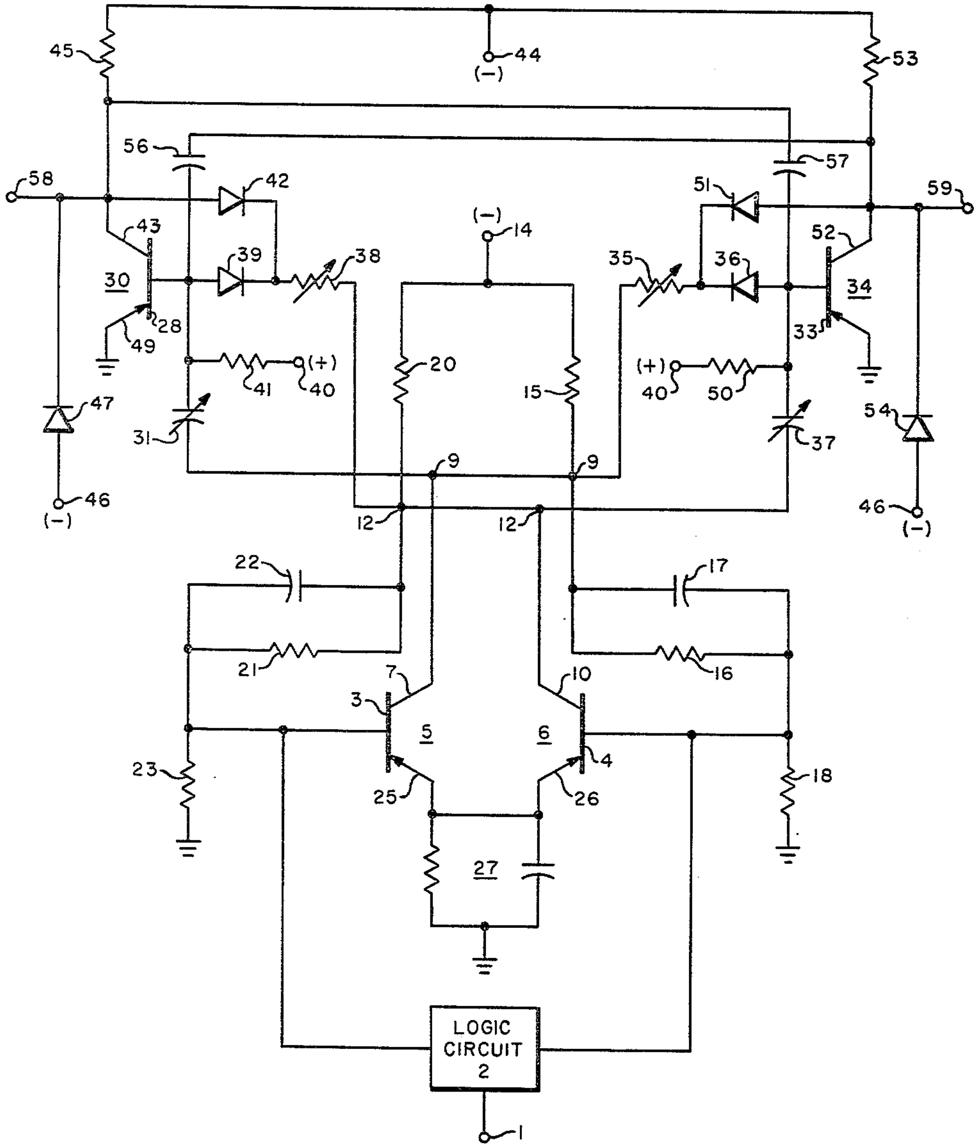
Figure 1 is a schematic circuit diagram of a bistable driven multivibrator delay circuit constructed in accordance with the invention.

In Fig. 1, trigger or clock pulses, from a source not shown, are applied to an input terminal 1 which is connected to the bases 3 and 4 of transistors 5 and 6, respectively, by a logic circuit 2 which applies the pulses alternately to bases 3 and 4. Transistors 5 and 6 are connected in a conventional Eccles-Jordan driven bistable multivibrator configuration. The output from collector 7 of transistor 5 is connected to a terminal 9 and the output from collector 10 of transistor 6 is connected to a terminal 12.

Terminal 9 is connected to a source of negative potential 14 through a resistor 15 and to the base 4 of transistor 6 by a resistor 16 and a parallel connected by-pass condenser 17. The base 4 is connected to ground through a resistor 18. Terminal 12 is connected to source 14 through a resistor 20 and to the base 3 of transistor 5 by a resistor 21 and a parallel connected by-pass condenser 22. The base 3 is connected to ground through a resistor 23. The emitter 25 of transistor 5 and the emitter 26 of transistor 6 are connected to one side of a grounded parallel connected R-C network 27.

Terminal 9 is connected to a base 28 of an output transistor 30 by an adjustable capacitor 31 and to the base 33 of another output transistor 34 by an adjustable resistor 35 connected in series with a silicon diode 36. Terminal 12 is connected to base 33 by an adjustable capacitor 37 and to base 28 by an adjustable resistor 38 connected in series with a silicon diode 39.

A positive source of biasing voltage 40 is connected to the junction of the base 28 and diode 39 by a resistor 41, and a germanium diode 42 is connected between the collector 43 of transistor 30 and the junction of silicon diode 39 and adjustable resistor 38. Diodes 39 and 42 are connected back to back and hold transistor 30 out of saturation by preventing the magnitude of the collector voltage from falling below the magnitude of the base voltage since the voltage drop across diode 42 is less than the voltage drop across diode 39.

The collector 43 is connected to a negative source of voltage 44 by a resistor 45 and to another negative voltage source 46 by a diode 47. Source 46 and diode 47 combine to prevent the magnitude of the voltage at collector 43 from exceeding the magnitude of voltage source 46. Therefore, collector 43 can only go positive with respect to source 46. The emitter 49 of transistor 30 is connected to ground.

The junction of base 33 of transistor 34 and diode 36 is connected to source 40 by a resistor 50, and a germanium diode 51 is connected between the collector 52 of transistor 34 and the junction of silicon diode 36 and adjustable resistor 35. Diodes 36 and 51 are connected back to back and perform the same function with respect to transistor 34 as do diodes 39 and 42 for transistor 30.

Collector 52 is connected to negative source 44 by a resistor 53 and to negative source 46 by a diode 54. Source 46 and diode 54 perform the same function with respect to transistor 34 as do source 46 and diode 47 for transistor 30.

Collector 52 of transistor 34 is connected to base 28 of transistor 30 by a speed-up or commutating capacitor 56, and collector 43 of transistor 30 is connected to base 33 of transistor 34 by a speed-up or commutating capacitor 57.

The circuit shown in Fig. 1 provides two time delayed outputs at terminals 58 and 59 which correspond to the clock or trigger pulses applied to input terminal 2.

Figure 2:
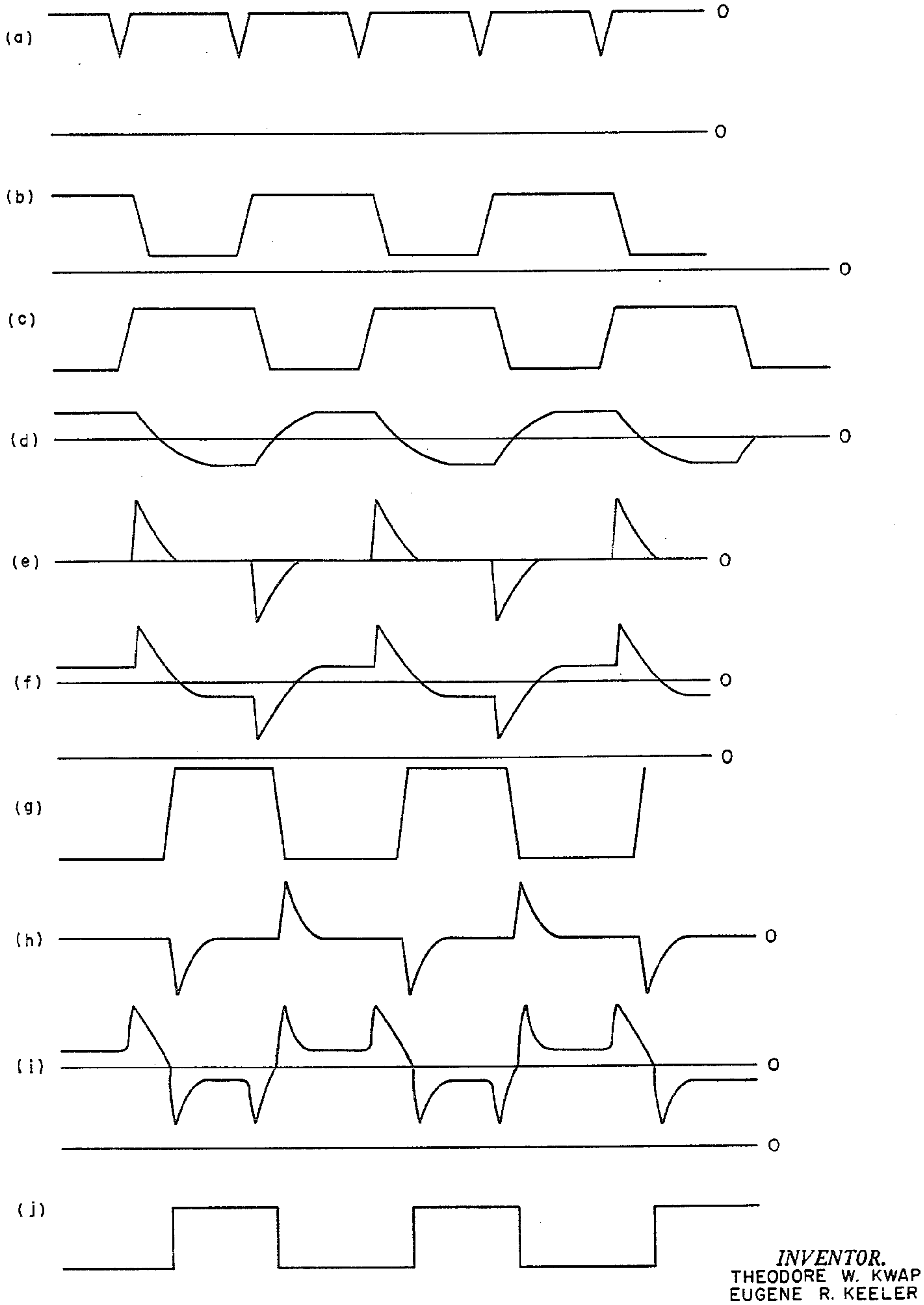
Figure 2 is a series of graphs showing voltages at various points in the circuit of Figure 1.

The operation of the device is best explained by the use of graphs (*a*–*j*) shown in Fig. 2 and the technique of superposition. The clock pulses applied at terminal 2 are shown in graph (*a*) and the output appearing at terminals 9 and 12 by graphs (*b*) and (*c*), respectively. Successive half-cycles of graphs (*b*) and (*c*) are not symmetrical due to delay introduced by the saturation of transistors 5 and 6, respectively. Since there is no delay when a transistor goes from "off" to "on" the "on" portion is longer than the "off" portion.

Considering only the case of transistor 34, the signal at terminal 9 is applied to the base 33 through an integrating network consisting of resistor 35 and capacitor 37 as indicated by graph (*d*). The signal at terminal 12 is applied to the base 33 through differentiating network consisting of condenser 37 and resistor 35 as indicated by graph (*e*). By superposition the input to the base 33 is shown in graph (*f*), and the ouput at terminal 59 due to transistor action on signals from terminals 9 and 12 is indicated in graph (*g*).

A signal similar to (*g*) except for a 180° phase shift appears at output terminal 58. Since the rise and fall time of these signals is not fast enough they are passed through their associated speed-up or commutating capacitors 56 and 57 and applied to the base of the opposite transistor. Graph (*h*) shows the output from transistor 30 as applied to the base 33 of transistor 34 and graph (*i*) is the composite input to the base 33 of transistor 34. Graph (*j*) shows the output resulting therefrom at output terminal 59.

The inputs and the output for transistor 30 would be identical to those described above relative to transistor 34 except for a phase shift of 180°.

The circuit described provides a fixed time delay which is dependent on fixed circuit elements and is not affected by power supply voltage variations. The amount of time delay may be varied by adjusting resistors 35 and 38, and capacitors 31 and 37. The circuit has been illustrated as applied to a negative logic circuit but it is equally suitable for use in a positive logic circuit.

Although one embodiment only of the invention has been shown and described in detail it is to be expressly understood that the invention is not limited thereto.

What is claimed is:

1. A delay circuit comprising, a bistable trigger circuit adapted to be connected to a source of trigger pulses and having a first and a second output, first and second switching means each having an input and an output, a summing network interconnecting said bistable circuit and said switching means, said network including first means for applying the integral of the first output and the differential of the second output to the first switching means input and second means for applying the differential of the first output and the integral of the second output to the second switching means input, and commutating means connecting the first switching means output to the second switching means input and the second switching means output to the first switching means input.

2. A delay circuit as defined in claim 1 wherein said commutating means includes a first capacitor connected between the output of the second switching means and the input of the first switching means and a second capacitor connected between the output of the first switching means and the input of the second switching means.

3. A delay circuit as defined in claim 1 wherein said summing network includes; a first resistor connected between the first trigger circuit output and the first switching means input, a first capacitor connected between the first trigger circuit output and the second switching means input, a second resistor connected between the second trigger circuit output and the second switching means input, and a second capacitor connected between the second trigger circuit output and the first switching means input.

4. A delay circuit as defined in claim 1 wherein said first and second switching means each include a transistor having at least two electrodes, one of which serves as an input and the other as an output.

5. A delay circuit comprising, a bistable trigger circuit adapted to be connected to a source of trigger pulses and having a first and second output, first and second switching means, each having an input and an output, a first resistor connected between the first trigger circuit output and the first switching means input, a first capacitor connected between said first trigger circuit output and the second switching means input, a second resistor connected between the second trigger circuit output and the second switching means input, a second capacitor connected between said second trigger circuit output and the first switching means input, a first commutating capacitor connected between the output of the second switching means and the input of the first switching means, and a second commutating capacitor connected between the output of the first switching means and the input of the second switching means.

6. A delay circuit as defined in claim 5 wherein said first and second switching means each include a transistor having at least two electrodes one of which serves as an input and the other as an output.

No references cited.